UNITED STATES PATENT OFFICE.

ROBERTS BARTHOLOW, OF CINCINNATI, OHIO.

IMPROVED PROCESS OF PREPARING PETROLEUM FOR THE MANUFACTURE OF PAINTS, &c.

Specification forming part of Letters Patent No. 47,084, dated April 4, 1865.

*To all whom it may concern:*

Be it known that I, ROBERTS BARTHOLOW, of Cincinnati, in the county of Hamilton, in the State of Ohio, have invented a new and improved method of manufacturing, compounding, and preparing paints for common purposes from crude petroleum and refined petroleum, in combination with acids and other substances; and I do hereby declare that the following is a full and exact description thereof.

The nature of my invention consists in the manufacture, compounding, and preparation of paints for common purposes of various colors and shades of color (as hereinafter set forth) from crude petroleum and refined petroleum, in combination with the following substances, viz: sulphuric acid, nitric acid, acetic acid, common glue, dry white lead, (otherwise known as "carbonate of lead,") zinc-white, (otherwise known as "oxide of zinc,") and other "white pigments" and pigments of various and all colors, combined and compounded together in the proportions and in the manner hereinafter at length specified.

To enable others skilled in the art to make and use my invention, I will proceed to describe the method of the manufacture, compounding, and preparation of the paints hereinbefore referred to.

First. To make brown paint, I take a vessel composed of a material which will resist the action of acids, and of a capacity sufficient to hold four times the amount of petroleum to be operated on, and put therein one (1) gallon of crude petroleum, and add thereto one (1) pound of common nitric acid. I then apply heat, and when nitrous-acid fumes are no longer driven off and ebullition or fuming ceases, I add to the mixture or preparation a solution of glue, previously prepared as follows, viz: a half-pound (½) of common glue dissolved in two (2) pounds of acetic acid by the aid of heat. After adding the above-named solution to the mixture I continue the heat for a few moments until combination be effected. As the mixture or preparation cools, it must be thoroughly ground up, when it will be ready for use.

Second. To produce lighter shades of brown color, buff color, cream color, drab color, and intermediate shades of those colors, and all other colors and shades of color between brown and white, I add to the brown paint (whose manufacture and preparation I have in the first item of this description at length specified) a quantity of dry white lead, (otherwise known as "carbonate of lead,") dry zinc-white, (otherwise known as "oxide of zinc,") or other white pigment sufficient to produce the color or shade of color desired, increasing the quantity of the white pigment in proportion to the lightness of the color desired.

Third. To make black paint, I proceed as follows, viz: I take a gallon of crude petroleum and put the same in a vessel composed of a material which will resist the action of acids, and add thereto two (2) pounds of common sulphuric acid, and apply heat, and when black oil is produced and masses of carbon are separated, I add to the mixture a solution of glue, previously prepared as follows, viz: a half-pound (½) of common glue dissolved in two (2) pounds of acetic acid by aid of heat; or I simply add to the mixture a half-pound (½) of glue, in lieu of the solution. After the addition of this solution or of the glue I continue the heat until combination be effected, stirring the mixture in the meanwhile. As the mixture cools, it must be thoroughly ground up, when it will be ready for use; or the above process may be varied by adding to the mixture of crude petroleum and sulphuric acid, (heat being applied thereto as before,) before the masses of carbon begin to separate, a quantity lamp-black, bone-black, or other black pigment until the proper consistency for painting is had, when it will be ready of use.

Fourth. To make dark olive-green paint, I take a vessel composed of a material which will resist the action of acids, and put therein twelve (12) ounces of crude petroleum, and add thereto four (4) ounces of common sulphuric acid. I then apply heat, and when the petroleum is carbonized or blackened, I add to the mixture a solution, previously prepared as follows, viz: one (1) ounce of common glue dissolved in sufficient lime-water to dissolve it. I continue the heat and stir the mixture until the ingredients are thoroughly incorporated together, when it will, upon being thoroughly ground up, be ready for use.

Fifth. To make paints of any desired color or shade of color, I proceed as follows, viz: For white paint and other light-colored paints I take a vessel composed of a material which will resist the action of acids, and of sufficient capacity to contain four times the bulk of the petroleum to be operated on, and put therein one (1) gallon of refined petroleum, and add thereto one-half (½) pint of common nitric acid. I then stir the mixture until the articles are well incorporated together, and then add gradually to the mixture or preparation one-half (½) pint of common sulphuric acid. If nitrous-acid fumes are not given off upon the addition of the sulphuric acid, heat must be applied to the mixture until nitrous-acid fumes do appear; but if nitrous-acid fumes are given off spontaneously, the heat may be omitted. I then add to the preparation or oil thus produced a quantity of dry white lead, (otherwise known as "carbonate of lead,") dry zinc-white, (otherwise known as "oxide of zinc,") or other white pigment, in order to produce a white paint, sufficient to produce the proper consistency for painting; or to produce other light-colored paints I add to the aforesaid preparation a quantity of such pigment as expresses the color desired sufficient to produce a mixture of the proper consistency for painting, when, after being thoroughly ground up, it will be ready for use. For making paints of dark colors or dark shades of color, I use crude petroleum instead of refined petroleum in making the mixture hereinbefore first in this fifth item described; but the remaining ingredients and process of manufacture are the same. Intermediate shades of positive and determinate colors may likewise be produced by combining two or more pigments of the proper colors to produce the shade of color desired. The respective quantities of the ingredients mentioned in all of the above formulas are indicated in order to give the relative proportions, and any multiples thereof may be employed, and slight variations from the above formulas will not materially affect the results, and such variations will in some cases prove advantageous or necessary, according as the petroleum is more or less dense and free or not free from water, or as the acids and other agents are pure or impure. The respective amounts of pigments in such parts of the above formulas as require the use of pigments needed cannot be specified in any correct or definite manner, on account of the impossibility of knowing beforehand as to the qualities of the materials to be employed in manufacture, and as to the precise shade or strength of color or consistency of the paint which may be desired in any given case. All of the above paints will be improved by carefully and thoroughly grinding them up after the processes are otherwise complete, respectively. When the paints in any case are too thick, they may be reduced to the proper consistency by the addition of oil prepared according to the manner set forth in the first paragraphs of the fifth item of this description, or of linseed or other oil sufficient to reduce it to the proper consistency.

What I claim as my invention, and desire to secure by Letters Patent, is—

The manufacture, compounding, and preparation of paints for common purposes, of various colors and shades of color, and embracing all colors and shades of color, from crude petroleum and refined petroleum, in combination with sulphuric acid, nitric acid, acetic acid, common glue, dry white lead, (otherwise known as "carbonate of lead,") dry white zinc, (otherwise known as "oxide of zinc,") and other white pigments and pigments of various colors, combined in the proportions and in the manner substantially as set forth above.

ROBERTS BARTHOLOW.

Witnesses:
SUSAN WALKER,
LISE SIEFKE.